(12) United States Patent
Komoda et al.

(10) Patent No.: US 11,273,551 B2
(45) Date of Patent: Mar. 15, 2022

(54) GRASPING CONTROL DEVICE, GRASPING SYSTEM, AND COMPUTER PROGRAM PRODUCT

(71) Applicants: Kabushiki Kaisha Toshiba, Minato-ku (JP); Toshiba Infrastructure Systems & Solutions Corporation, Kawasaki (JP)

(72) Inventors: Kazuma Komoda, Kawasaki (JP); Akihito Ogawa, Fujisawa (JP); Haruna Eto, Ota (JP); Seiji Tokura, Kawasaki (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 301 days.

(21) Appl. No.: 16/122,043

(22) Filed: Sep. 5, 2018

(65) Prior Publication Data
US 2019/0283249 A1 Sep. 19, 2019

(30) Foreign Application Priority Data
Mar. 19, 2018 (JP) .............................. JP2018-051333

(51) Int. Cl.
*B25J 9/16* (2006.01)

(52) U.S. Cl.
CPC ............ *B25J 9/1612* (2013.01); *B25J 9/163* (2013.01); *B25J 9/1666* (2013.01); *B25J 9/1669* (2013.01)

(58) Field of Classification Search
CPC ...... B25J 9/1612; B25J 9/1613; B25J 9/1617; B25J 9/1615; B25J 15/024; B25J 9/1669
See application file for complete search history.

(56) References Cited

U.S. PATENT DOCUMENTS

| | | | |
|---|---|---|---|
| 7,017,961 B1 * | 3/2006 | Parnell ................. | B25J 15/0616 294/188 |
| 8,355,816 B2 * | 1/2013 | Saito ..................... | B25J 9/1697 700/253 |
| 9,050,722 B2 * | 6/2015 | Satou ..................... | B25J 9/1612 |
| 9,205,558 B1 | 12/2015 | Zevenbergen et al. | |

(Continued)

FOREIGN PATENT DOCUMENTS

JP 2000-127071 5/2000

*Primary Examiner* — Jeff A Burke
*Assistant Examiner* — Joshua Alexander Garza
(74) *Attorney, Agent, or Firm* — Oblon, McClelland, Maier & Neustadt, L.L.P.

(57) ABSTRACT

According to an embodiment, a grasping control device controls a grasping device including grasping members to grasp an object. The grasping control device includes a selector, a first determination unit and a controller. The selector selects at least one grasping form for the object based on first information relating to the object, from among a plurality of grasping forms determined by a number and an arrangement of the grasping members. The first determination unit determines a usage form realizing the selected grasping form, from among a plurality of usage forms determined by at least one of second information relating to the grasping device and third information relating to an obstacle. The controller controls the grasping device such that at least one of grasping members grasps the object according to the determined usage form.

18 Claims, 12 Drawing Sheets

(56) References Cited

U.S. PATENT DOCUMENTS

| | | | |
|---|---|---|---|
| 9,321,176 B1* | 4/2016 | Sun | B25J 9/1656 |
| 9,669,543 B1* | 6/2017 | Stubbs | H05K 999/99 |
| 2013/0211593 A1* | 8/2013 | Domae | B25J 9/1612 |
| | | | 700/258 |
| 2014/0163731 A1* | 6/2014 | Shi | B25J 9/1669 |
| | | | 700/250 |
| 2014/0277721 A1* | 9/2014 | Tomo | B25J 9/1612 |
| | | | 700/253 |
| 2015/0066199 A1 | 3/2015 | Shimono | |
| 2016/0207195 A1* | 7/2016 | Eto | B25J 9/1612 |
| 2017/0368693 A1* | 12/2017 | Chinatalapalli Patta | |
| | | | B25J 15/0052 |
| 2019/0001491 A1* | 1/2019 | Umeyama | B25J 15/103 |
| 2019/0248600 A1* | 8/2019 | Nesbit | B25J 15/0625 |
| 2019/0315578 A1* | 10/2019 | Moriya | B65G 47/917 |

\* cited by examiner

FIG.14
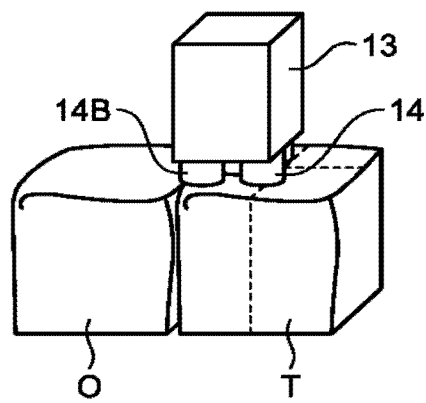
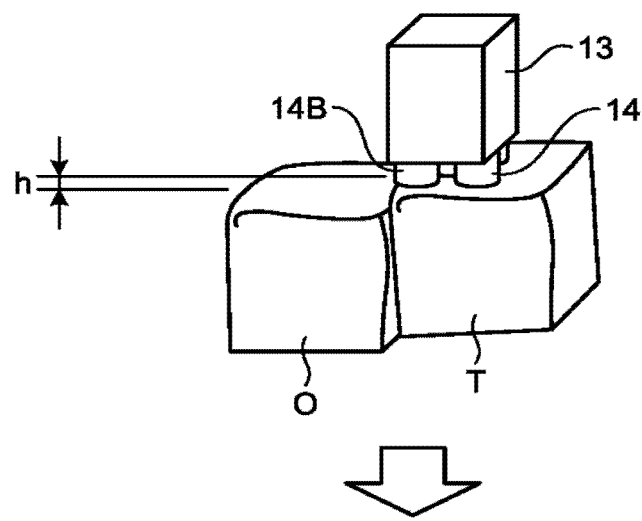
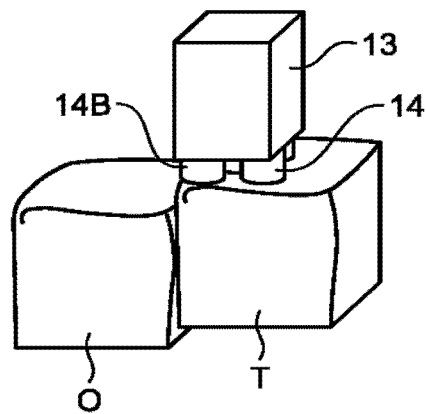

GRASPING CONTROL DEVICE, GRASPING SYSTEM, AND COMPUTER PROGRAM PRODUCT

CROSS-REFERENCE TO RELATED APPLICATIONS

This application is based upon and claims the benefit of priority from Japanese Patent Application No. 2018-051333, filed on Mar. 19, 2018; the entire contents of which are incorporated herein by reference.

FIELD

Embodiments described herein relate generally to a grasping control device, a grasping system, and a computer program product.

BACKGROUND

Conventionally, a grasping control device that controls an actuator so that an end effector grasps an object has been known.

In this type of grasping control device, for example, it is beneficial when a grasping control device causing less inconvenience can be obtained.

BRIEF DESCRIPTION OF THE DRAWINGS

FIG. 14 is a schematic and illustrative explanatory diagram illustrating an example of grasping control by a grasping controller of the first embodiment;

DETAILED DESCRIPTION

Figure 1:
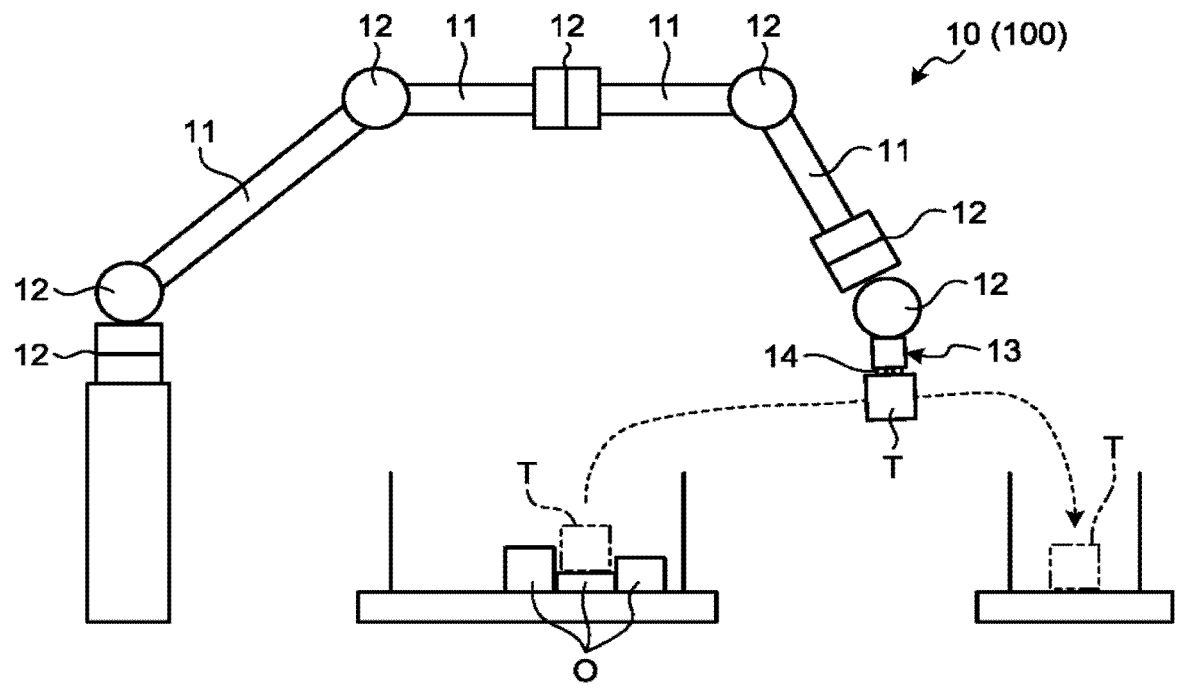
FIG. 1 is a schematic and illustrative configuration diagram of a manipulator system including a manipulator according to an embodiment.

According to an embodiment, a grasping control device controls a grasping device including grasping members to grasp an object. The grasping control device includes a selector, a first determination unit and a controller. The selector selects at least one grasping form for the object based on first information relating to the object, from among a plurality of grasping forms determined by a number and an arrangement of the grasping members. The first determination unit determines a usage form realizing the selected grasping form, from among a plurality of usage forms determined by at least one of second information relating to the grasping device and third information relating to an obstacle. The controller controls the grasping device such that at least one of grasping members grasps the object according to the determined usage form.

Hereinafter, exemplary embodiments and modifications of a grasping control device are disclosed. Configurations and controls (technical features) of the embodiments and modifications described below, and the actions and results (effects) brought about by the configurations and controls are examples.

In addition, the same constituent elements are included in the following embodiments and modifications. In description below, a common reference numeral is assigned to the same constituent elements, and a repeated description is omitted in some cases. In addition, in the present specification, ordinal numbers are given for the sake of convenience to distinguish the constituent elements, etc., and do not indicate the order of priority or order.

First Embodiment

FIG. 1 is a configuration diagram of a manipulator 10. The manipulator 10 is included in a manipulator system 100 together with a control device 20 (see FIG. 4) (not illustrated in FIG. 1). The manipulator 10 may also be referred to as a robot arm. The manipulator 10 grasps an object T and moves the object T from a position at which the object T is present to another place. The manipulator 10 is an example of a grasping device. The manipulator system 100 is an example of a grasping system. The control device 20 is an example of a grasping control device.

The manipulator 10 is configured as a so-called articulated arm in which a plurality of arms 11 is rotatably connected to each other at a joint 12. The control device 20 controls operation of a first actuator 15 (see FIG. 4) (not illustrated in FIG. 1) to change an angle between two arms 11 at each joint 12, thereby changing a position or a posture of the manipulator 10. For example, the joint 12 is a rotary joint, a ball joint, etc. The first actuator 15 is driven by an electrical control signal generated by the control device 20. For example, the first actuator 15 is a motor, an artificial muscle, etc. The manipulator 10 may include a prismatic joint. The arm 11 is an example of a movable member.

The manipulator 10 has an end effector 13 at a distal end thereof. The end effector 13 is an example of the movable member.

Figure 2:
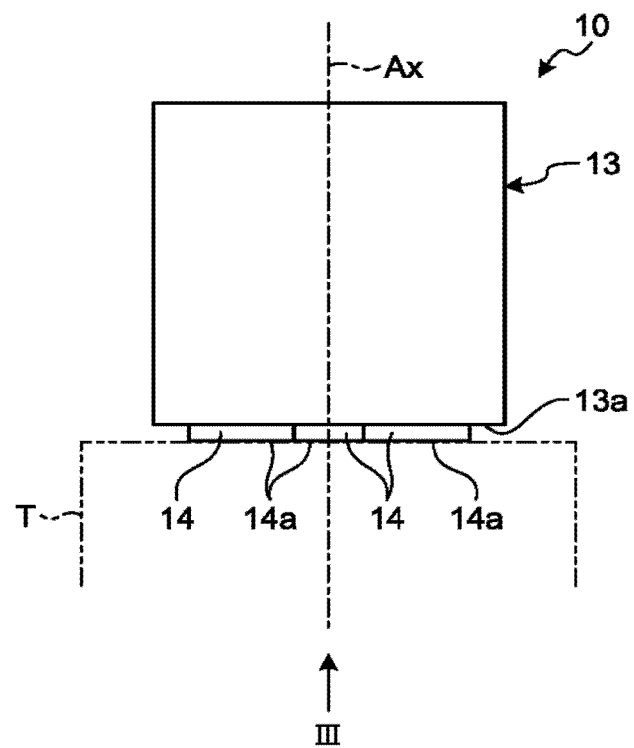
FIG. 2 is a schematic and illustrative side view of an end effector included in the manipulator of a first embodiment.
Figure 3:
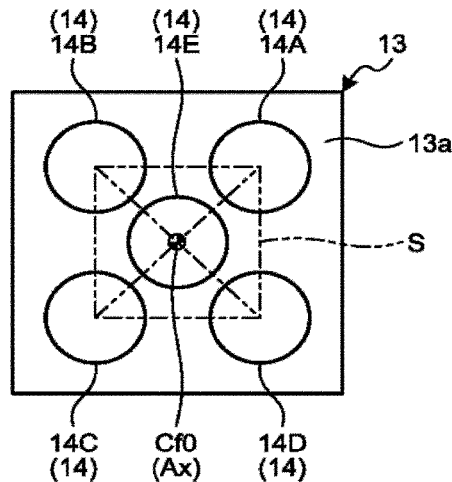
FIG. 3 is a schematic and illustrative diagram of the end effector of the first embodiment when viewed from a direction III of FIG. 2.

FIG. 2 is a side view of the end effector 13, and FIG. 3 is a diagram of the end effector 13 viewed from an arrow III in FIG. 2.

As one example, the end effector 13 is configured as a vacuum chuck having a plurality of suction pads 14A to 14E (14). By controlling an operation of a second actuator 16 (see FIG. 4) (not illustrated in FIG. 1), the control device 20 may selectively actuate suction of air from the suction pads 14, thereby absorbing and holding the object T. In addition, the control device 20 can release the object T by controlling the second actuator 16 to suspend suction of air from the suction pads 14 suctioning the object T. The second actuator 16 is, for example, a pneumatic electric pump, an electric valve, etc. The suction pads 14 may also be referred to as a suction portion, a grasping portion, etc. The suction pad 14 is an example of a grasping member. The second actuator 16 is an example of an actuator.

Adsorption of the object T by the suction pads 14 needs to be performed at a posture and a position close to the adsorbable surface (adsorption surface, target surface) of the object T. Therefore, when the end effector 13 starts adsorbing (grasping) the object T, the control device 20 controls the first actuator 15 to obtain a grasping position and a grasping posture at which the end effector 13 can absorb (grasp) the object T. The grasping position is also referred to as a grasping start position, and the grasping posture may also be referred to as a grasping start posture.

As illustrated in FIG. 2, the plurality of suction pads 14 protrudes from an end surface 13a of the end effector 13. The plurality of suction pads 14 has the same specifications. Each of the suction pads 14 is a substantially cylindrical nozzle. Distal ends 14a (opening edges) of the plurality of suction pads 14 are disposed along the end surface 13a, in other words, along substantially the same plane.

As illustrated in FIG. 3, in the present embodiment, the number of the suction pads 14 is five. Four suction pads 14A to 14D are disposed to be positioned at corners of a virtual square S indicated by a broken line in FIG. 3, and one suction pad 14E is disposed to be positioned at a center of the virtual square S (intersection of two diagonal lines). Therefore, the plurality of suction pads 14 is disposed to have rotational symmetry (tetragonal symmetry) about a centroid Cf0 thereof (center of gravity in FIG. 3). The control device 20 may obtain the same arrangement of the plurality of suction pads 14 at a plurality of (four) rotation angles around an axis Ax, which passes through the centroid Cf0 and is orthogonal to a virtual plane along which the distal ends 14a of the suction pads 14 approximately extends (or the end surface 13a), by rotating the end effector 13 around the axis Ax (see FIGS. 2 and 3). The axis Ax may not correspond to a rotation axis of the joint 12 of the manipulator 10.

Figure 4:
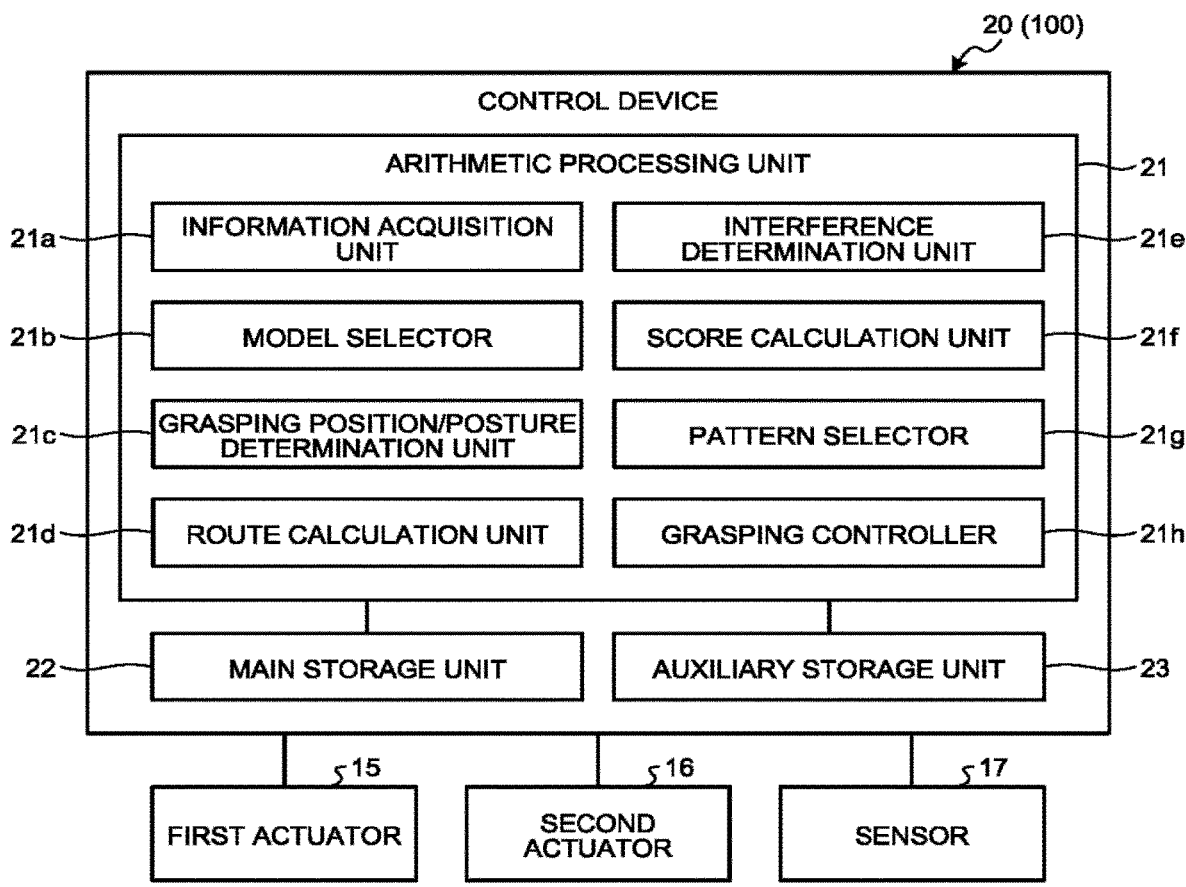
FIG. 4 is a schematic and illustrative block diagram of a control device of the manipulator of the embodiment.

FIG. 4 is a block diagram of the control device 20. The control device 20 includes an arithmetic processing unit 21, a main storage unit 22, and an auxiliary storage unit 23. The arithmetic processing unit 21 is, for example, a central processing unit (CPU). The control device 20 includes a read only memory (ROM), a random access memory (RAM), etc. as the main storage unit 22, and includes a hard disk drive (HDD), a solid state drive (SSD), a flash memory, etc. as the auxiliary storage unit 23.

The arithmetic processing unit 21 includes an information acquisition unit 21a, a model selector 21b, a grasping position/posture determination unit 21c, a route calculation unit 21d, an interference determination unit 21e, a score calculation unit 21f, a pattern selector 21g, and a grasping controller 21h.

The information acquisition unit 21a acquires information (feature information, attribute information, and detection information) of the object T, an obstacle O, and the manipulator 10. Information on the object T, the obstacle O, and the manipulator 10 is obtained from, for example, a detection value by the sensor 17. The sensor 17 is, for example, an RGB-D sensor, a camera, a contact sensor, a distance sensor, etc. Further, for example, the information acquisition unit 21a may acquire information from a database having known information on the object T, the obstacle O, and the manipulator 10, a light detection and ranging, laser imaging detection and ranging (LIDAR), auxiliary storage unit 23, etc. Further, the information acquisition unit 21a may acquire the information on the manipulator 10 from the first actuator 15 or the second actuator 16, or calculate the information from a control command value to the first actuator 15 or the second actuator 16 by the grasping controller 21h. The information on the object T is an example of first information. The information on the manipulator 10 is an example of second information. The information on the obstacle O is an example of third information.

The model selector 21b selects a grasping mode by the suction pads 14 based on at least the information on the object T. A grasping form of the object T by the suction pads 14 is referred to as a model in this specification. The model selector 21b is an example of a selector.

Figure 5:
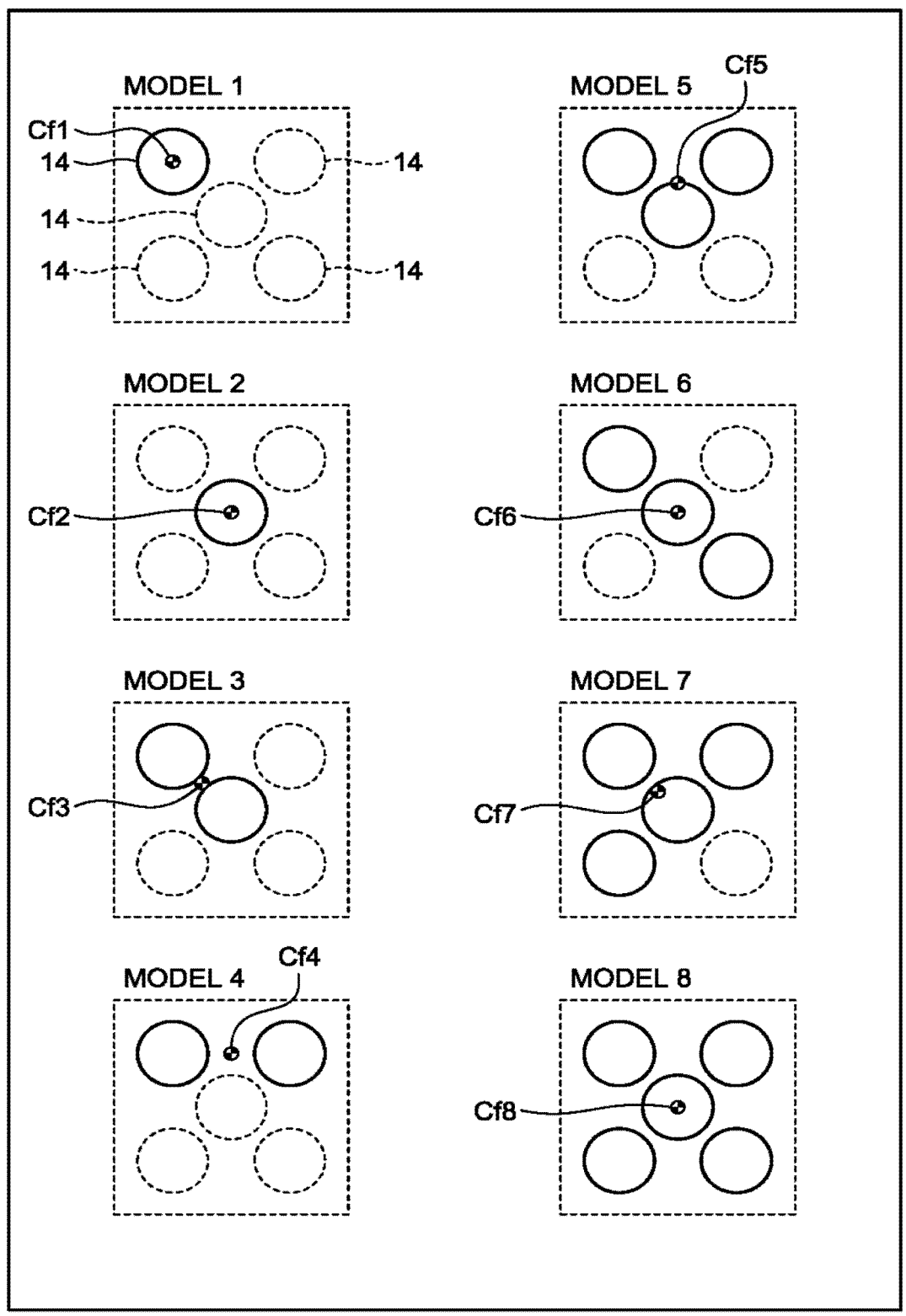
FIG. 5 is a schematic and illustrative diagram illustrating a model of a grasping form by the end effector of the first embodiment.

FIG. 5 is a diagram illustrating a plurality of models. A model is a division of grasping modes by the suction pads 14 determined based on the number and arrangement of the suction pads 14, and may also be referred to as a mode. In the model, a suction pad 14 to be used is not completely specified. In each model of FIG. 5, a suction pad 14 which is actuated is indicated by a solid circle, and a suction pad 14 which is not actuated is indicated by a broken line circle. In the present embodiment, Model 1 and Model 2 are set as a grasping mode using one suction pad 14, Model 3 and Model 4 are set as a grasping mode using two suction pads 14, Model 5 and Model 6 are set as a grasping mode using three suction pads 14, Model 7 is set as a grasping mode using four suction pads 14, and Model 8 is set as a grasping mode using five suction pads 14.

Considering a rotational symmetry of a layout of the plurality of suction pads 14, four combinations of the suction pads 14 correspond to Model 1. That is, the four combinations correspond to a case in which the suction pad 14A (see FIG. 3) is actuated and the other suction pads 14B to 14E (see FIG. 3) are not actuated, a case in which the suction pad 14B is actuated and the other suction pads 14A and 14C to 14E are not actuated, a case in which the suction pad 14C is actuated and the other suction pads 14A, 14B, 14D, and 14E are not actuated, and a case in which the suction pad 14D is actuated and the other suction pads 14A to 14C and 14E are not actuated. A combination belonging to each model indicates a usage form (candidate) of the suction pad 14 satisfying the grasping form, and the usage form (candidate) is referred to as a pattern in this specification. Model 1 includes four patterns. In the pattern, the suction pad 14 to be used is specified.

Similarly, considering rotational symmetry, four combinations of the suction pads 14 correspond to each of Model 2, Model 5, Model 6, Model 7, and Model 8. In other words, four patterns are included in each of Model 2, Model 5, Model 6, Model 7, and Model 8. Model 2 includes four patterns having different positions of the suction pads 14A to 14D which are not actuated.

In addition, considering rotational symmetry, four combinations of the suction pads 14 correspond to each of Model 3 and Model 4. However, when switching (inversion) of positions of two suction pads 14 is taken into consideration, the combinations are further doubled. Therefore, eight combinations of the suction pads 14 correspond to each of Model 3 and Model 4. In other words, each of Model 3 and Model 4 includes eight patterns.

In addition, as is apparent from FIG. 5, in the present embodiment, the models do not include a grasping form in which actuated suction pads 14 are disposed on both sides of the non-actuated suction pad 14E at a center, that is, a grasping form in which the suction pad 14E at the center is not actuated in Models 6, 7, and 8. A reason therefor is that in a case in which the suction pad 14E at the center can be disposed on a surface of the object T, the object T can be more surely grasped when the suction pad 14E is actuated.

Cf1 to Cf8 indicated in the respective Models 1 to 8 of FIG. 5 are centroids (centers of gravity) of the suction pads 14.

For each of Models 1 to 8, a grasping-enabled weight is determined. The model selector 21b selects a model having a larger grasping-enabled weight than a weight of the object T.

Figure 6:
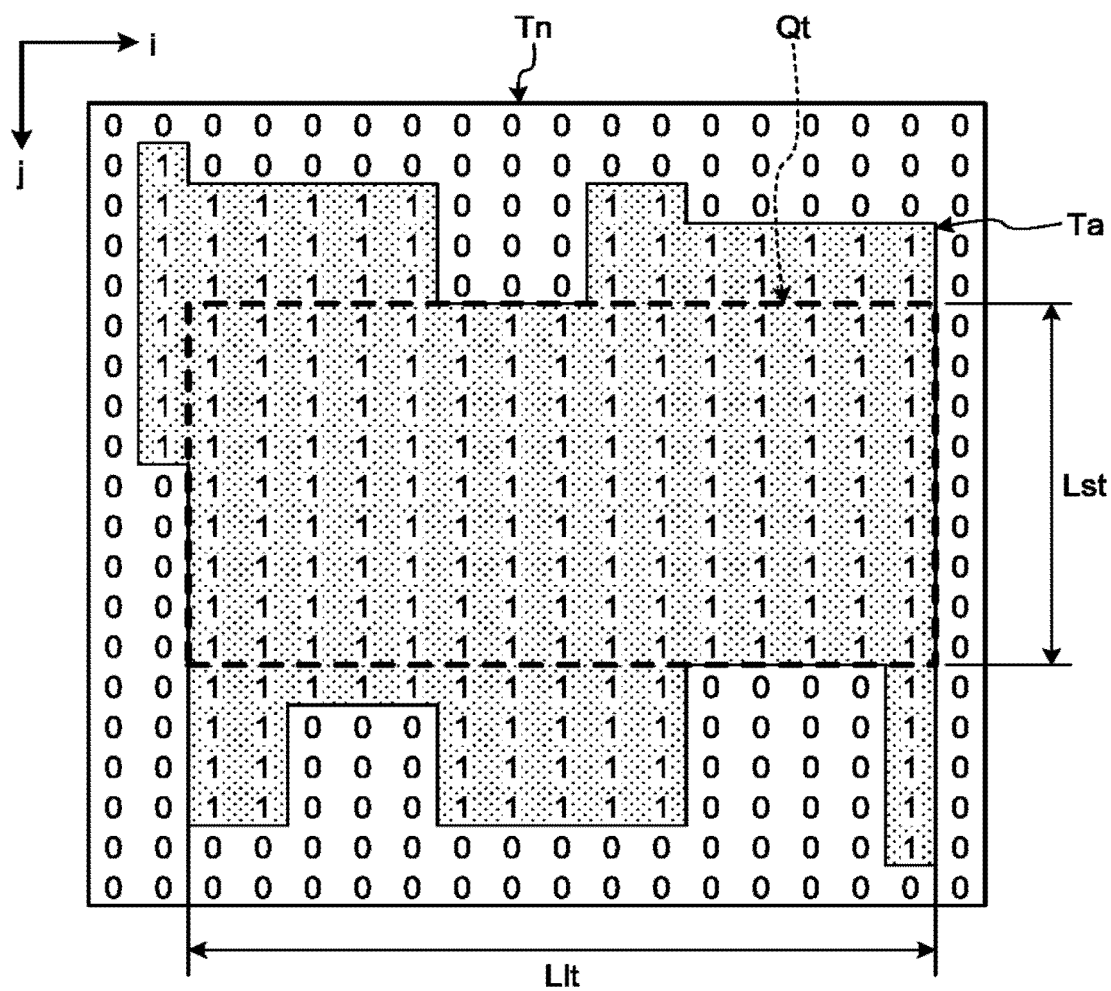
FIG. 6 is a schematic and illustrative diagram illustrating a grasping-enabled target region detected on a surface of an object of the end effector of the first embodiment.
Figure 7:
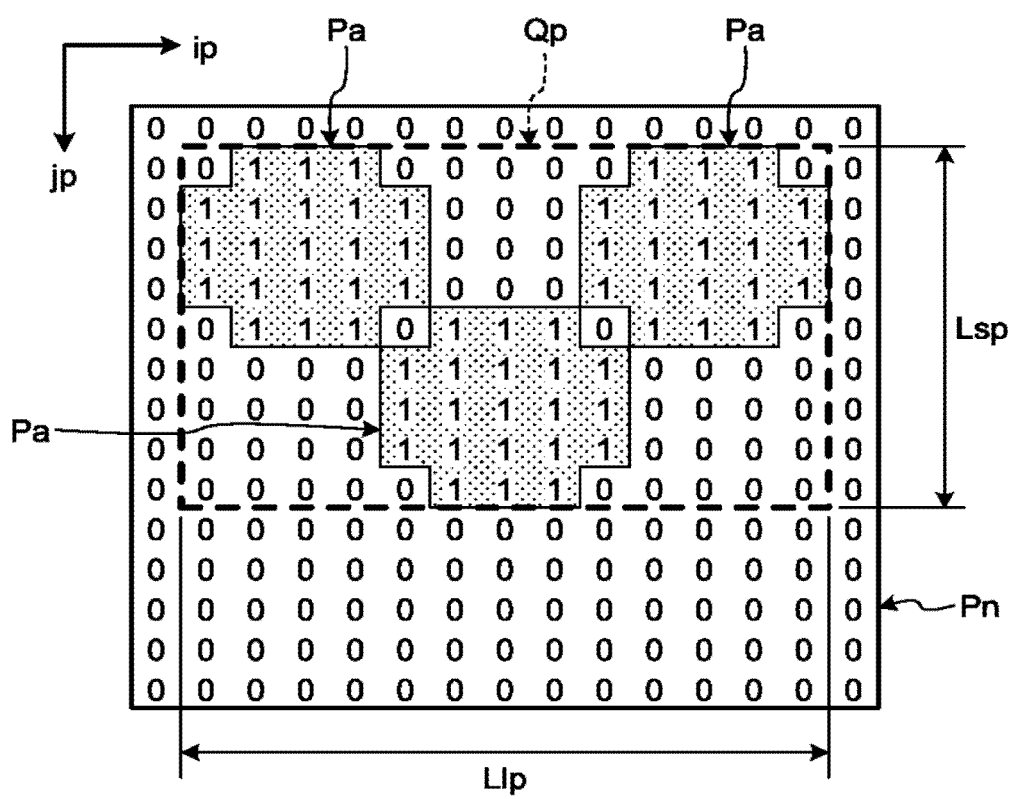
FIG. 7 is a schematic and illustrative diagram illustrating a pad region of a model having a grasping form selected with respect to the target region in FIG. 6 by the control device of the first embodiment.

FIG. 6 is a diagram illustrating a grasping-enabled target region Ta detected on a surface (adsorption surface, target surface) of the object T. In addition, FIG. 7 is a diagram illustrating a pad region Pa in which the suction pad 14 faces the target region Ta in Model 5 including three suction pads 14. The target region Ta may also be referred to as a grasping-enabled region. For example, the target region Ta is a region in which flatness is within a first threshold value and an area is equal to or larger than a second threshold value in the surface of the object T. FIG. 6 illustrates binarized data. In FIG. 6, a place in which a numerical value is "1" corresponds to the target region Ta, and a place in which a numerical value is "0" corresponds to a non-target region Tn (grasping-disabled region). In addition, FIG. 7 illustrates binarized data. In FIG. 7, a place in which a numerical value is "1" corresponds to the pad region Pa, and a place in which a numerical value is "0" corresponds to a non-pad region Pn.

The model selector 21b selects a model based on a shape and size of the target region Ta of the object T. Specifically, first, the model selector 21b acquires information indicating a size of a largest quadrangle Qt (inscribed quadrangle) included in the target region Ta, for example, a long side Llt (length) and a short side Lst (length) illustrated in FIG. 6 from information indicating the target region Ta obtained based on a detection value by the sensor 17. The long side Llt and the short side Lst are examples of information indicating the target region Ta.

Then, the model selector 21b selects at least one model that can be disposed inside the quadrangle Qt based on the long side Llt and the short side Lst. Specifically, for example, for each model, information indicating a long side Llp and a short side Lsp of a circumscribed quadrilateral Qp capable of accommodating the model illustrated in FIG. 7 is stored in the auxiliary storage unit 23. The model selector 21b selects, from a plurality of models, a model in which the long side Llt of the quadrangle Qt is equal to or greater than the long side Llp of the circumscribed quadrilateral Qp (Llt≥Llp) and the short side Lst of the quadrangle Qt is equal to or greater than the short side Lsp of the circumscribed quadrilateral Qp (Lst≥Lsp) as a candidate for the grasping form of the target region Ta.

Figure 8:
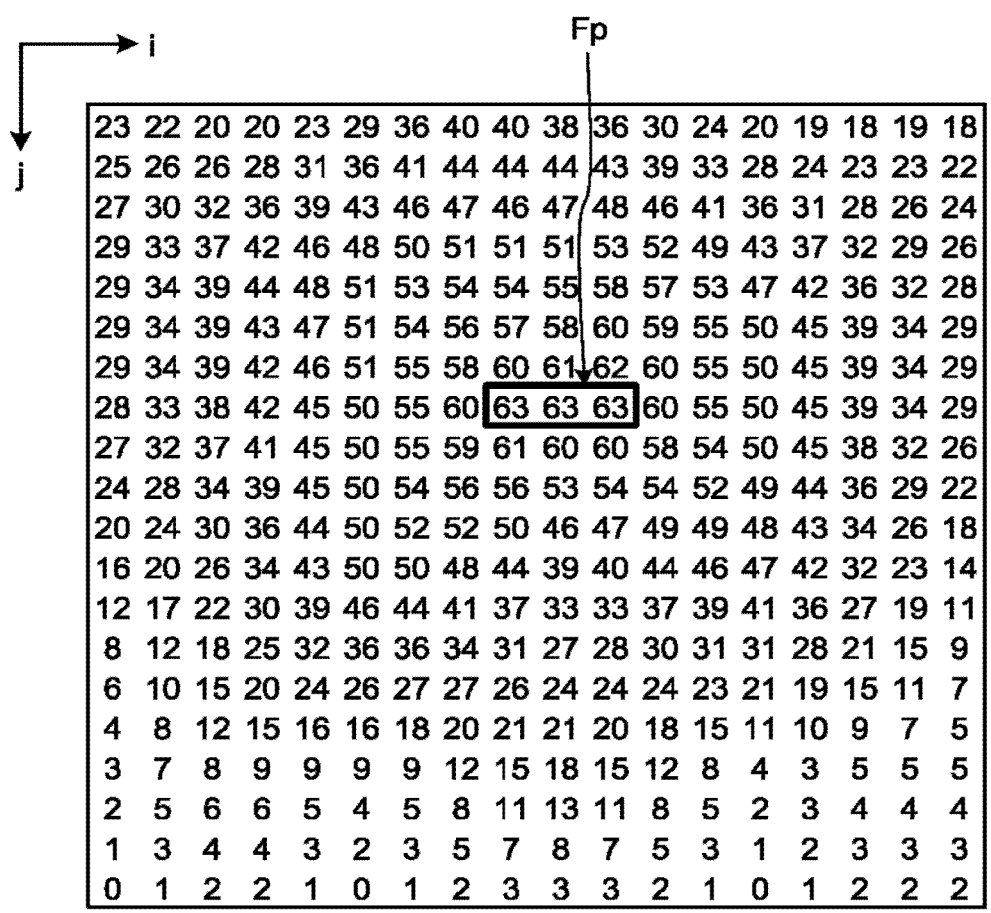
FIG. 8 is a schematic and illustrative diagram illustrating a calculation result of a convolution condition of the target region in FIG. 6 and the pad region in FIG. 7.

In addition, the grasping position/posture determination unit 21c determines an absorption position (grasping position) of the suction pad 14 in the model which is the candidate for the grasping form with respect to the target region Ta. FIG. 8 is a calculation result of a convolution condition of the target region Ta of FIG. 6 and the pad region Pa of Model 5 in FIG. 7. Specifically, a numerical value indicated in each pixel in FIG. 8 indicates a convolution condition in a case in which the centroid Cfp of the pad region Pa (center of gravity in FIG. 7) is located at a position of the pixel. For pixels overlapping each other, the convolution condition is a total value (integrated value) of values obtained by multiplying a value (1 or 0) of a pixel in data of FIG. 6 including the target region Ta by a value (1 or 0) of a pixel in data of FIG. 7 including the pad region Pa for all pixels. As indicated by a thick frame Fp in FIG. 8, the grasping position is set to a position at which the convolution condition is the highest within the target region Ta and at a position at which the centroid of the pad region Pa is within the thick frame Fp in FIG. 8. It is possible to determine a rotation angle (posture) at which the convolution condition is the highest as a grasping posture by executing the same calculation as described above for each angle position while changing a rotation angle of data including the pad region Pa. The grasping position/posture determination unit 21c may set the grasping position so that at least the convolution condition is equal to or greater than a predetermined value (threshold value), and it is not indispensable to set the grasping position at a position at which the convolution condition is the largest. The grasping position/posture determination unit 21c is an example of a second determination unit.

The route calculation unit 21d calculates a movement route of the end effector 13 from a current position and a current posture to the grasping position and the grasping posture. In addition, the interference determination unit 21e determines the presence or absence of interference between the manipulator 10 and the obstacle O with respect to movement of the end effector 13 on the calculated movement route.

Figure 9:
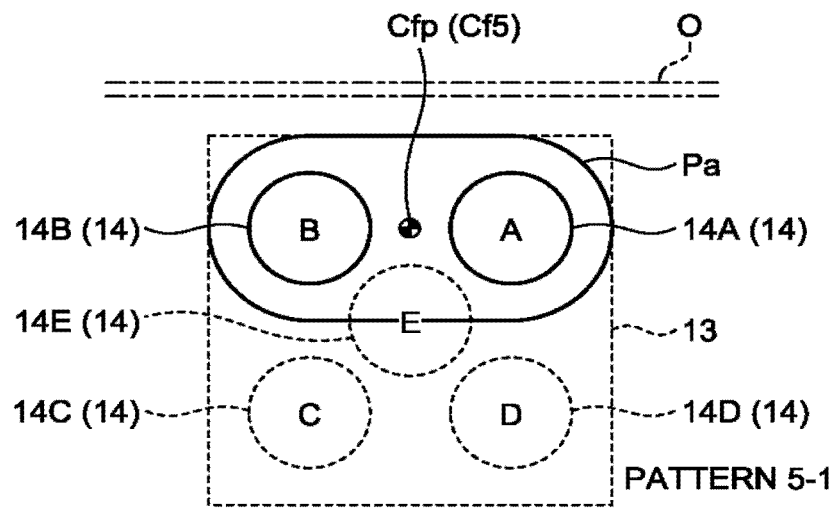
FIG. 9 is a schematic and illustrative diagram illustrating an arrangement of suction pads in one pattern in a case in which a model corresponding to the target region is selected in a model selector of the first embodiment and a centroid of the pad region corresponding to the target region is calculated in a grasping position/posture determination unit.
Figure 10:
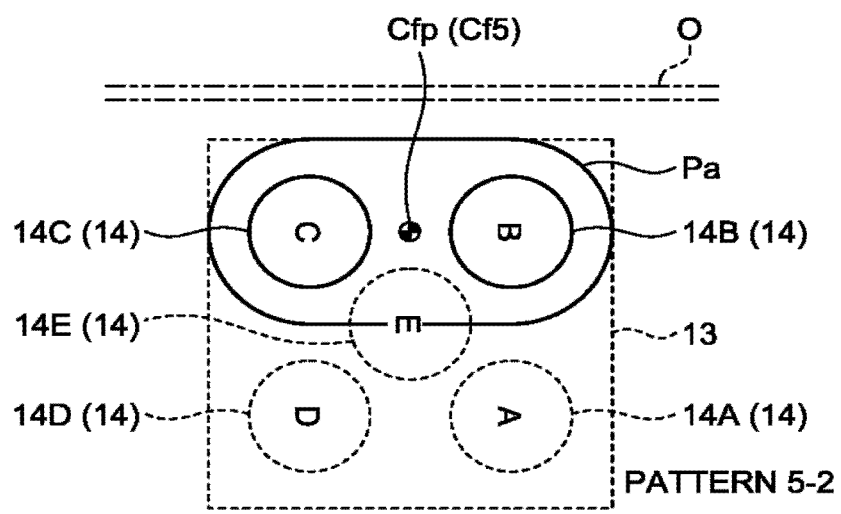
FIG. 10 is a schematic and illustrative diagram illustrating an arrangement of the suction pads in a different pattern from the pattern of FIG. 9 in a case in which a model corresponding to the target region is selected in the model selector of the first embodiment and the centroid of the pad region corresponding to the target region is calculated in the grasping position/posture determination unit.
Figure 11:
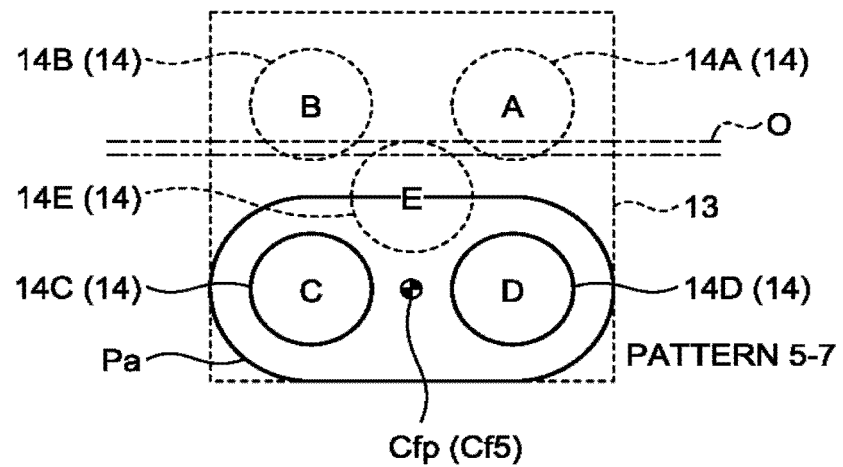
FIG. 11 is a schematic and illustrative diagram illustrating an arrangement of the suction pads in a different pattern from the patterns of FIG. 9 and FIG. 10 in a case in which a model corresponding to the target region is selected in the model selector of the first embodiment and the centroid of the pad region corresponding to the target region is calculated in the grasping position/posture determination unit.

Calculation of the movement route and determination of the presence or absence of interference are executed for each pattern (candidate) included in the selected model. FIG. 9 illustrates an arrangement of the suction pads 14 in Pattern 5-1 in a case in which Model 2 corresponding to the target region Ta (not illustrated in FIG. 9) is selected in the model selector 21b and the centroid Cfp of the pad region Pa corresponding to the target region Ta is calculated in the grasping position/posture determination unit 21c. FIG. 10 illustrates an arrangement of the suction pads 14 in Pattern 5-2 in a case in which Model 2 is selected in the model selector 21b and the centroid Cfp of the pad region Pa is calculated in the grasping position/posture determination unit 21c. FIG. 11 illustrates an arrangement of the suction pads 14 in Pattern 5-7 in a case in which Model 2 is selected in the model selector 21b and the centroid Cfp of the pad region Pa is calculated in the grasping position/posture determination unit 21c. As is apparent from comparison between FIG. 9 and FIG. 10, between the case of Pattern 5-1 and the case of Pattern 5-2, positions of the suction pads 14A to 14D corresponding to the target region Ta are different, and thus the movement route of the end effector 13 (manipulator 10) from the current position and the current posture to the grasping position and the grasping posture is different. In addition, as is apparent from comparison between FIGS. 9 and 10 and FIG. 11, between the case of Pattern 5-1 and Pattern 5-2 and the case of Pattern 5-7, a position of the end effector 13 corresponding to the target region Ta is different, and thus the movement route of the end effector 13 (manipulator 10) from the current position and the current posture to the grasping position and the grasping posture is different. In FIGS. 9 to 11, a number of the pattern is a provisional number.

As illustrated in FIG. 11, in a case in which interference between the end effector 13 and the obstacle O around the object T (for example, a wall of a container accommodating the object T) is clear at the grasping position and the grasping posture of Pattern 5-7 from the detection value of the sensor 17, etc., the interference determination unit 21e excludes Pattern 5-7 from the object (candidate) for selecting the pattern.

Figure 12:
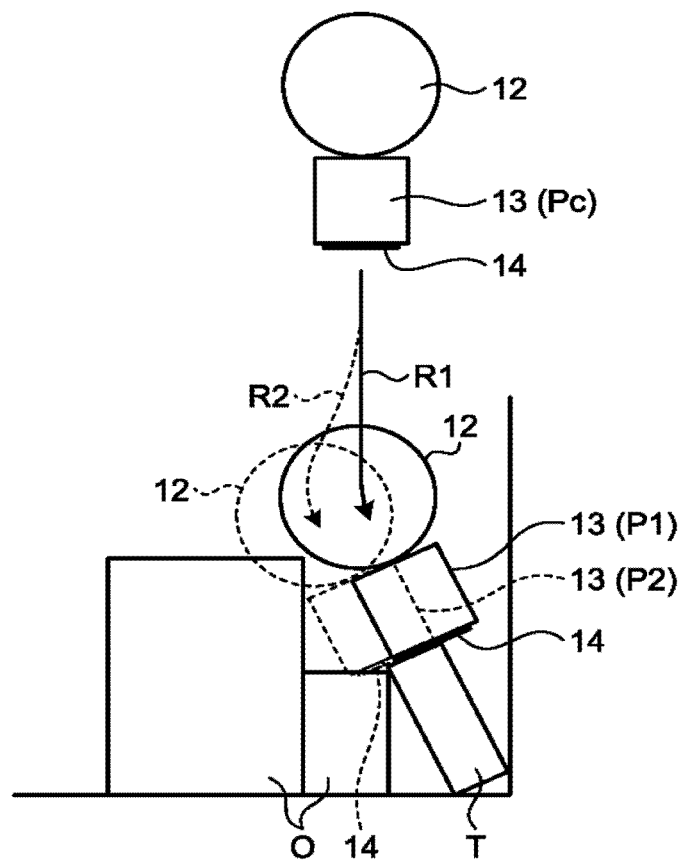
FIG. 12 is a schematic and illustrative diagram illustrating a current position and a current posture of the end effector of the first embodiment, grasping positions and grasping postures in two patterns by the end effector, and routes from the current position and the current posture to the grasping positions and the grasping postures.

FIG. 12 is a diagram illustrating a current position Pc (current posture), a grasping position P1 (grasping posture), a grasping position P2 (grasping posture), a route R1 from the current position Pc to the grasping position P1, and a route R2 from the current position Pc to the grasping position P2 of the end effector 13. The route calculation unit 21d calculates the routes R1 and R2 for each pattern, and the interference determination unit 21e calculates the presence or absence of interference between the end effector 13 and the manipulator 10, and the obstacle O other than the object T with respect to movement of the end effector 13 and the manipulator 10 on the respective routes R1 and R2. In an example of FIG. 12, while the end effector 13 and the manipulator 10 do not interfere with the obstacle O from the current position Pc to the grasping position P1 when a pattern becoming the grasping position P1 is selected, the end effector 13 and the manipulator 10 interfere with the obstacle O from the current position Pc to the grasping position P2 when a pattern becoming the grasping position P2 is selected. The interference determination unit 21e excludes the pattern corresponding to the interfering route R2, that is, the pattern becoming the grasping position P2 from the object (candidate) for selecting the pattern. The interference determination unit 21e is an example of a determination unit.

For each pattern (candidate), the score calculation unit 21f calculates a score as an index (index to be determined) for selecting a pattern in the pattern selector 21g. The score calculation unit 21f calculates a score x using Equation (1) below by setting a variable (numerical value, physical quantity) of each term of the score to $x_i$ (i=1, 2, . . . , n) and a coefficient (weighting coefficient) of each term to $a_i$ (i=1, 2, . . . , n).

$$x = a_1 x_1 + a_2 x_2 + \ldots + a_n x_n \quad (1)$$

For each pattern, examples of the variable include the number of suction pads 14, a distance between the centroid (center of gravity) of the suction pad 14 and the centroid (center of gravity) of the object T, operating quantity (movement length, movement angle, and energy consumption amount) from the current position and the current posture to the grasping position and the grasping posture, a required time from the current position and the current posture to the grasping position and the grasping posture, a distance from the end effector 13 to the obstacle O at the grasping position and the grasping posture, an angle of the target region Ta with respect to a horizontal plane, a height of the target region Ta, etc. Each coefficient is set such that the score increases as the number of suction pads 14 increases, the score increases as the distance between the centroid (center of gravity) of the suction pad 14 and the centroid (center of gravity) of the object T decreases, the score decreases as the distance from the end effector 13 to the obstacle O decreases, the score increases as the angle of the manipulator 10 and the target region Ta with respect to the horizontal plane decreases, and the score increases as the height of the target region Ta increases. The variable (numerical value, physical quantity) may be a physical quantity based on at least one of information on the object T, information on the manipulator 10, and information on the obstacle O, and the physical quantity may be involved in availability, efficiency, quickness, energy consumption, certainty, robustness, reliability, etc. of grasping or carrying. The invention is not limited to the examples. In addition, at least one term may be included in Equation (1), and types or the number of variables, a magnitude of a coefficient for each index, etc. may be appropriately adjusted according to a use environment, etc. Information indicating the target region Ta is an example of fourth information.

The pattern selector 21g selects (determines) a usage form (candidate) of a pattern having the highest score as a usage form used for control.

The grasping controller 21h controls the first actuator 15 and the second actuator 16 such that the end effector 13 and the manipulator 10 pass through the movement route calculated for the usage form of the selected pattern from the current position and the current posture, reach the calculated grasping position and grasping posture, and grasp the object T. The pattern selector 21g is an example of a first determination unit. The grasping controller 21h is an example of a controller.

Figure 13:
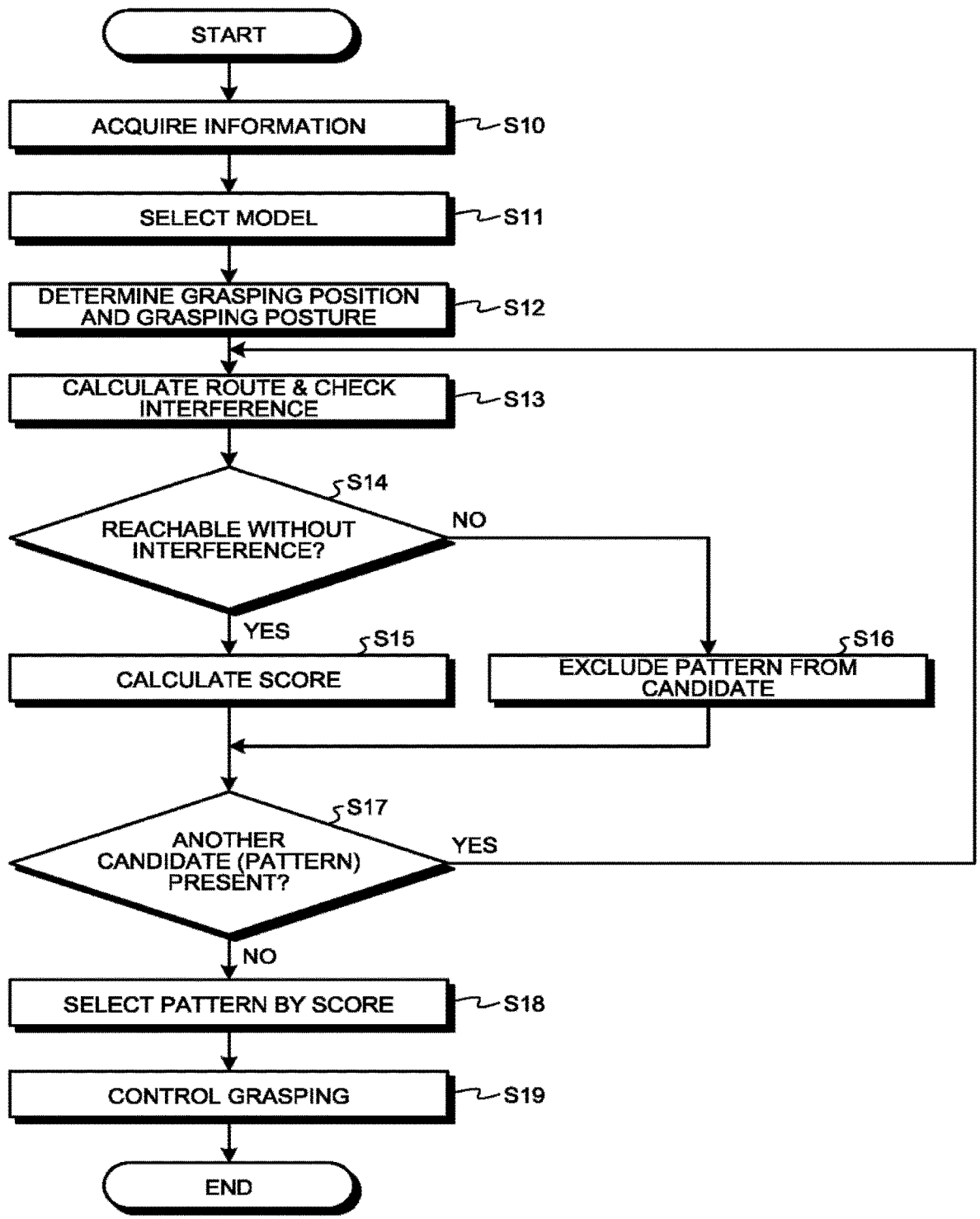
FIG. 13 is a schematic and illustrative flowchart illustrating a control procedure by the control device of the first embodiment.

FIG. 13 is a flowchart illustrating a control procedure by the control device 20. As illustrated in FIG. 13, the arithmetic processing unit 21 functions as the information acquisition unit 21a to acquire information on the object T, information on the obstacle O, and information on the manipulator 10 (S10). Subsequently, the arithmetic processing unit 21 functions as the model selector 21b to select a model (grasping form) (S11). A pattern included in the model selected in S11 is a candidate for pattern selection in S18. Subsequently, the arithmetic processing unit 21 functions as the grasping position/posture determination unit 21c to determine a grasping position and a grasping posture by the model (S12).

Subsequently, the arithmetic processing unit 21 functions as the route calculation unit 21d and the interference determination unit 21e to calculate a route from the current position and the current posture to the grasping position and the grasping posture of the end effector 13 for each pattern (candidate for the usage form) included in the selected model (grasping form) and calculate the presence or absence of interference between the end effector 13 and the manipulator 10, and the obstacle O other than the object T with respect to movement of the end effector 13 and the manipulator 10 on the route (S13).

When the end effector 13 can reach the grasping position and the grasping posture without interference with the obstacle O from the current position and the current posture (Yes in S14), the arithmetic processing unit 21 functions as the score calculation unit 21ƒ to calculate a score for each pattern (S15).

On the other hand, when the interference is present (No in S14), the pattern is excluded from the candidate for pattern selection in S18 (S16).

When there is a pattern which is another candidate (Yes in S17), S13 to S16 are executed for the pattern which is another candidate.

On the other hand, when there is no pattern which is another candidate (No in S17), the pattern selector 21g selects a usage form (candidate) of a pattern having the highest score as a usage form used for control (S18), and the grasping controller 21h controls the first actuator 15 and the second actuator 16 such that the end effector 13 and the manipulator 10 pass through the movement route calculated for the usage form of the selected pattern from the current position and the current posture, reach the calculated grasping position and grasping posture, and grasp the object T (S19).

FIG. 14 is an explanatory diagram illustrating an example of grasping control by the grasping controller 21h. When a distance between the suction pad 14B and the obstacle O is within a distance h (predetermined distance), and the object T can be grasped by another suction pad 14 excluding the suction pad 14B, the grasping controller 21h may not actuate the suction pad 14B in a state in which the distance between the suction pad 14B and the obstacle O is within the distance h. In this case, while the end effector 13 moves from a grasping start time illustrated in an upper part of FIG. 14, and the distance between the suction pad 14B and the obstacle O illustrated in a middle part of FIG. 14 reaches the distance h, the grasping controller 21h controls the second actuator 16 such that the suction pad 14B is not actuated. Then, the second actuator 16 is controlled such that the suction pad 14B is actuated after a state in which the distance between the suction pad 14B and the obstacle O illustrated in the middle part of FIG. 14 is the distance h. The suction pad 14B in this case is an example of a first grasping member.

Arithmetic processing and control by the control device 20 may be executed by software or may be executed by hardware. In addition, the arithmetic processing and control by the control device 20 may include arithmetic processing and control by software and arithmetic processing and control by hardware. In the case of processing by software, the control device 20 reads and executes a program (application) stored in a recording medium (storage medium) such as a ROM, a HDD, a SSD, a flash memory, etc. By actuation according to a program, the control device 20 functions as each unit included in the control device 20, that is, the information acquisition unit 21a, the model selector 21b, the grasping position/posture determination unit 21c, the route calculation unit 21d, the interference determination unit 21e, the score calculation unit 21ƒ, the pattern selector 21g, the grasping controller 21h, etc. In this case, the program includes a module corresponding to each unit.

The program can be provided by being recorded in a computer-readable recording medium such as a CD-ROM, an FD, a CD-R, a DVD, a USB memory, etc. in a file in an installable format or an executable format. Further, the program may be introduced by being stored in a storage unit of a computer connected to a communication network and downloaded via the network. Further, the program may be incorporated in a ROM, etc. in advance.

In addition, when at least a part of the control device 20 is configured by hardware, the control device 20 may include, for example, a field programmable gate array (FPGA), an application specific integrated circuit (ASIC), etc.

As described above, according to the present embodiment, for example, the model selector 21b (selector) selects a model with respect to the object T from among a plurality of models (grasping forms) determined according to the number and arrangement of suction pads 14 based on the information on the object T (first information), the pattern selector 21g (first determination unit) determines a pattern (usage form) in which a suction pad 14 realizing the selected model is specified based on at least one of the information on the manipulator 10 (second information) and the information on the obstacle O (third information), and the grasping controller 21h controls the first actuator 15 and the second actuator 16 such that at least one suction pad 14 grasps the object T by the determined pattern. According to such a configuration, for example, the control device 20 may execute calculation of the route or calculation of the presence or absence of the interference with the obstacle O for a model narrowed down by the model selector 21b or a pattern narrowed down by the pattern selector 21g, and thus may reduce a calculation load of the control device 20 when compared to a case in which calculation of the route or calculation of the presence or absence of the interference with the obstacle O is executed for all conceivable patterns. Therefore, for example, the manipulator system 100 may grasp or carry the object T more rapidly.

In addition, in the present embodiment, for example, the grasping position/posture determination unit 21c (second determination unit) calculates the grasping position and the grasping posture of the object T for each model. According to such a configuration, for example, it is possible to reduce a calculation load of the control device 20 when compared to a case in which the grasping position or the grasping posture is calculated for all conceivable patterns. Therefore, for example, the manipulator system 100 may grasp or carry the object T more rapidly.

In addition, in the present embodiment, for example, the interference determination unit 21e (determination unit) determines whether the end effector 13 and the manipulator 10 (grasping device) can reach the grasping position and the grasping posture without interference with the obstacle O from the current position and the current posture for each pattern (candidate for the usage form), and the pattern selector 21g determines a pattern used for control from among candidates for the pattern that can reach the grasping position and the grasping posture without interference with the obstacle O from the current position and the current posture. According to such a configuration, for example, it is possible to suppress interference between the end effector 13 and the manipulator 10, and the obstacle O when the object T is grasped and carried by the end effector 13 and the manipulator 10.

In addition, in the present embodiment, for example, the score calculation unit 21ƒ calculates a score based on at least one physical quantity for each pattern (candidate), and the pattern selector 21g determines a candidate for a pattern having the highest score as a pattern used for control. According to such a configuration, grasping and carrying of the object T by the end effector 13 and the manipulator 10 can be realized by a more appropriate pattern.

In addition, in the present embodiment, for example, the model selector 21*b* may select a model based on the target region Ta and an arrangement of the suction pads 14 (grasping members) in each pattern. According to such a configuration, for example, it is possible to omit unnecessary calculation for a model in which the object T may not be grasped and a pattern belonging to the model.

In addition, in the present embodiment, for example, the model does not include a model in which used suction pads are disposed on both sides of an unused suction pad 14. According to such a configuration, for example, since the type (number) of models can be reduced, the calculation load by the control device 20 can be reduced when compared to a case in which the model is included.

In addition, in the present embodiment, for example, in a case in which the distance between the suction pad 14B (first grasping member) and the obstacle O is within the predetermined distance, and the object T can be grasped by another suction pad 14 even when the suction pad 14B is not actuated, the grasping controller 21*h* controls the second actuator 16 such that the suction pad 14B is not actuated in a state in which the distance between the suction pad 14B and the obstacle O is within the distance h. According to such a configuration, for example, it is possible to suppress suction of the obstacle O by the suction pad 14B.

Second Embodiment

Figure 15:
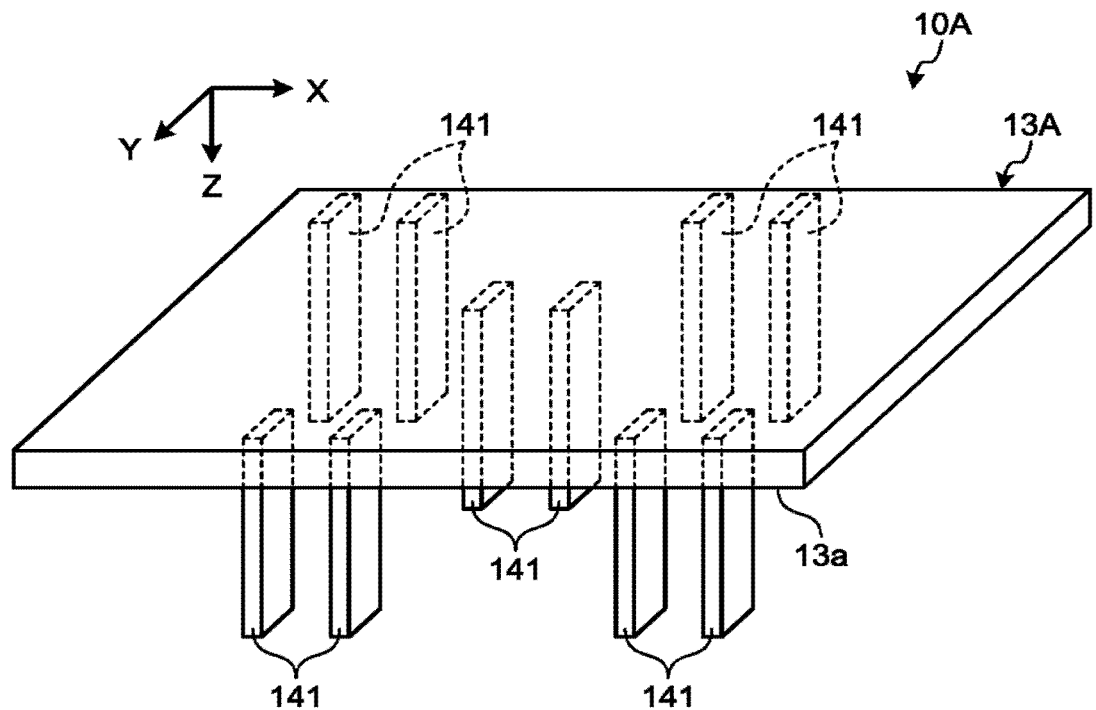
FIG. 15 is a schematic and illustrative perspective view illustrating an end effector of a second embodiment.
Figure 16:
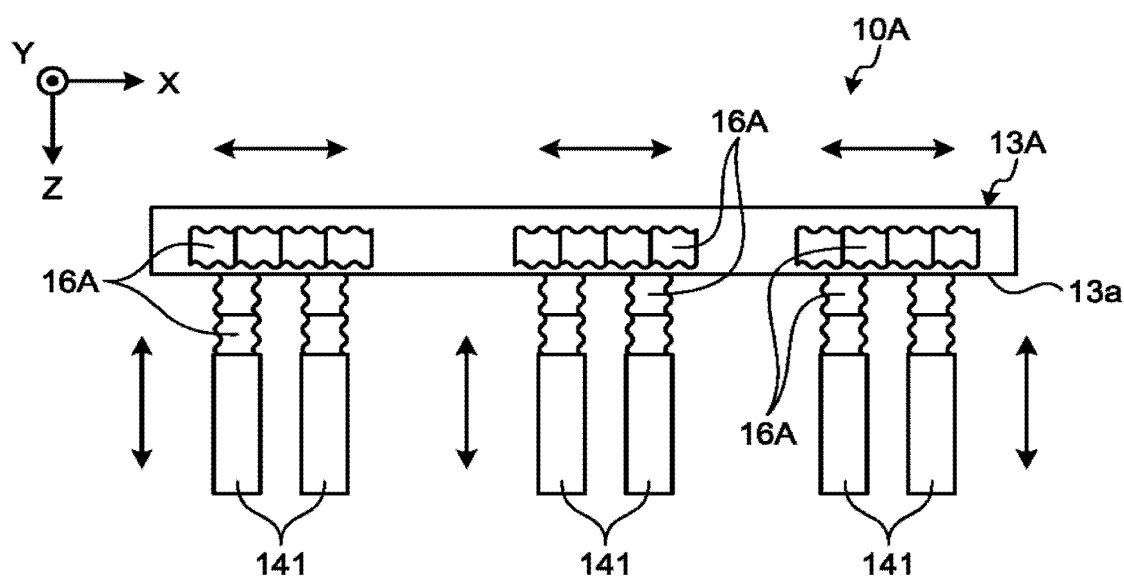
FIG. 16 is a schematic and illustrative side view illustrating the end effector of the second embodiment.

FIG. 15 is a perspective view of an end effector 13A of a second embodiment, and FIG. 16 is a side view of the end effector 13A. In a manipulator 10A of the present embodiment, a grasping member (movable member) of the end effector 13A is a clamping member 141. The clamping member 141 protrudes from an end surface 13*a* in a direction intersecting (direction orthogonal to) the end surface 13*a*. Each clamping member 141 is configured to be able to extend and contract in a direction intersecting the end surface 13*a* (Z direction of FIGS. 15 and 16), and is configured to be movable in a direction along the end surface 13*a* (X direction and Y direction of FIGS. 15 and 16) by a second actuator 16A. A control device 20 controls the second actuator 16A such that a plurality of (two or more) clamping members 141 selectively protrudes and clamps an object T. For example, the end effector 13A can grasp an object T which may not be grasped by a suction pad 14 whose surface is a curved surface or a mesh. The second actuator 16A is an example of an actuator.

Figure 17:
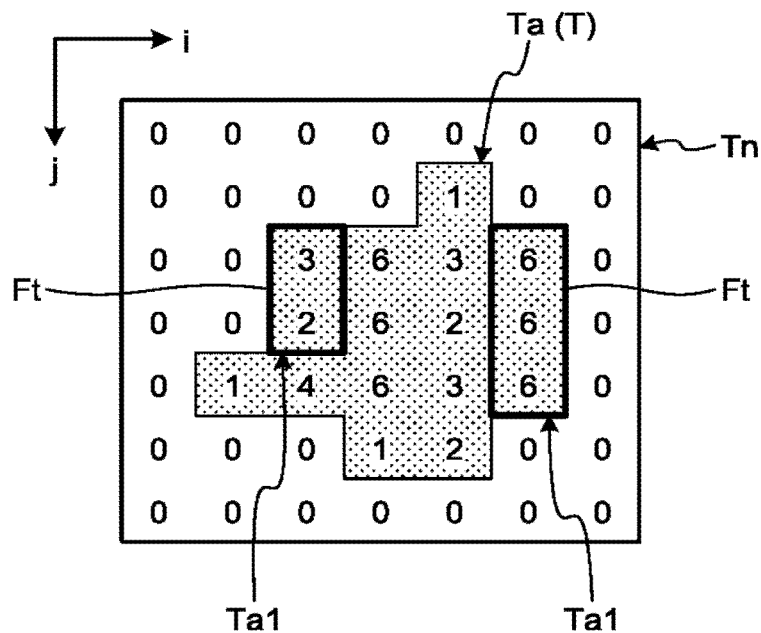
FIG. 17 is a schematic and illustrative diagram illustrating a grasping-enabled target region detected in an object of the end effector of the second embodiment.

FIG. 17 is a diagram illustrating a grasping-enabled target region Ta detected in the object T. In FIG. 17, an i direction is along the X direction of FIGS. 15 and 16, and a j direction is along the Y direction of FIGS. 15 and 16. In the present embodiment, for example, the target region Ta is determined by a thickness (height, depth) of the object T in an extending and contracting direction of the clamping member 141 detected by a sensor 17 such as the RGB-D sensor. In FIG. 17, a part in which a numerical value of a pixel is 0 is a non-target region Tn which is not the object T, a part in which a numerical value of a pixel is 1 or more is the target region Ta, and the thickness (height) of the object T increases as a numerical value of each pixel increases. In this case, for example, when regions in which a numerical value of a pixel is equal to or greater than a predetermined value (for example, 3) are arranged in parallel at a predetermined interval at a boundary with the non-target region Tn by two-dimensional calculation in the i and j directions, that is, when a part Ta1 indicated by a thick frame Ft in FIG. 17 is present, the control device 20 may determine that the target region Ta can be grasped.

Modification of Second Embodiment

Figure 18:
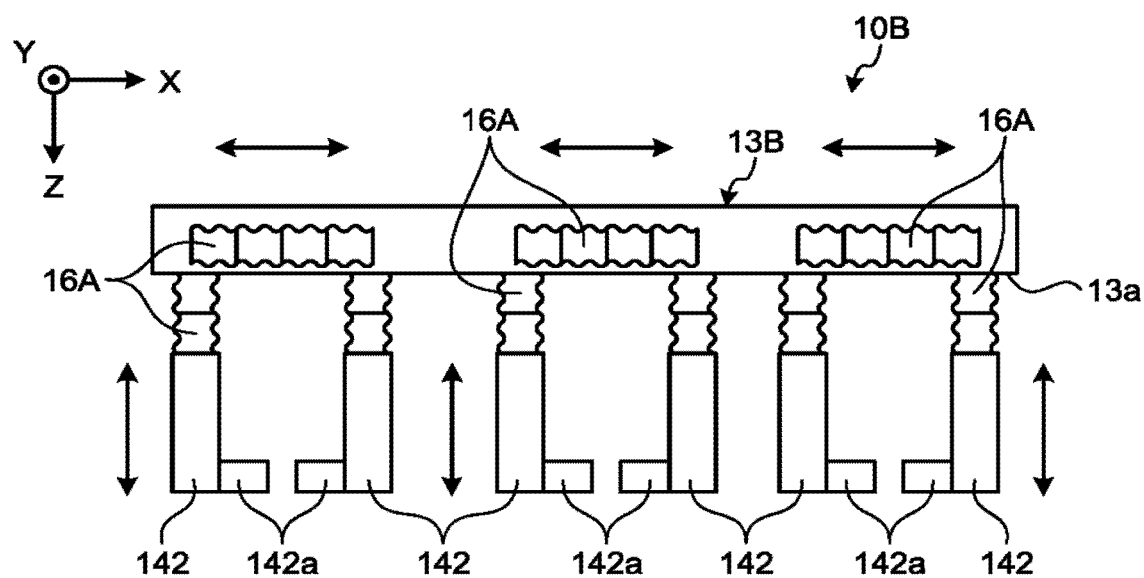
FIG. 18 is a schematic and illustrative side view of an end effector of a modification of the second embodiment.

FIG. 18 is a side view of an end effector 13B of a modification of the second embodiment. In a manipulator 10B of the present modification, a grasping member (movable member) of the end effector 13B is a scooping member 142. The scooping member 142 protrudes from an end surface 13*a* in a direction intersecting (direction orthogonal to) the end surface 13*a*. A hook 142*a* protruding to bend in a hook shape in a direction approaching another scooping member 142 forming a pair is provided at an end of the scooping member 142. Each scooping member 142 is configured to be able to extend and contract in a direction intersecting the end surface 13*a*, and is configured to be movable in a direction along the end surface 13*a* by a second actuator 16A. The control device 20 controls the second actuator 16A such that a plurality of (two or more) scooping members 142 selectively protrudes and scoops up the object T. The end effector 13B can grasp the object T which may not be grasped by the suction pad 14 or the clamping member 141.

While certain embodiments have been described, these embodiments have been presented by way of example only, and are not intended to limit the scope of the inventions. Indeed, the embodiments described herein may be embodied in a variety of other forms; furthermore, various omissions, substitutions, combinations and changes may be made without departing from the spirit of the inventions. The accompanying claims and their equivalents are intended to cover the embodiments as would fall within the scope and spirits of the inventions. In addition, configurations and shapes of the embodiments can be partly exchanged. Further, specifications (structure, type, direction, format, size, length, width, thickness, height, angle, number, arrangement, position, material, etc.) of each configuration and shape may be changed as appropriate and implemented.

For example, the grasping member may grasp the object in a mode other than absorption, clamping, and scooping. In addition, the number and arrangement of grasping members may be variously changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A grasping control device for controlling a grasping device including grasping members to grasp an object, comprising:

a memory that stores a plurality of grasping forms each indicating a number of used grasping members of the grasping members arranged in a predetermined pattern and an arrangement pattern of the used grasping members, the used grasping members each being to be used to grasp the object without pinching the object in cooperation with another member and the arrangement pattern being realized without changing relative positions between the grasping members; and circuitry configured to implement:

a selector that selects at least one grasping form for the object based on first information relating to the object from among the plurality of grasping forms;

a first determination unit that determines a usage form realizing the selected grasping form from among a plurality of usage forms determined by at least one of second information relating to the grasping device and third information relating to an obstacle; and a controller that controls the grasping device such that at least one of grasping members grasps the object according to the determined usage form.

2. The grasping control device according to claim 1, wherein the circuitry is further configured to implement a second determination unit that determines a grasping position and a grasping posture of the object by the at least one of the grasping members in the selected grasping form.

3. The grasping control device according to claim 2, wherein the circuitry is further configured to implement a determination unit capable of determining whether the grasping device is reachable to the grasping position and the grasping posture without an interference with the obstacle from a current position and a current posture for each of candidates for the usage form capable of realizing the grasping form, and the first determination unit determines the usage form from among the candidates reachable to the grasping position and the grasping posture without an interference with the obstacle from the current position and the current posture.

4. The grasping control device according to claim 1, wherein the circuitry is further configured to implement a score calculation unit that calculates a score based on at least one physical quantity, the score serving as an index for determination in the first determination unit, for each candidate for the usage form capable of realizing the grasping form based on at least one of the first information, the second information, and the third information, and the first determination unit determines a candidate having a highest score as the usage form.

5. The grasping control device according to claim 4, wherein the physical quantity includes the number of the used grasping members.

6. The grasping control device according to claim 4, wherein the physical quantity includes a distance between a centroid of the used grasping members and a centroid of the object.

7. The grasping control device according to claim 4, wherein the physical quantity includes an operating quantity from a current position and a current posture of the grasping members to a position and a posture of the grasping members in the grasping form.

8. The grasping control device according to claim 4, wherein the physical quantity includes a required time from a current position and a current posture of the grasping members to a position and a posture of the grasping members in the grasping form.

9. The grasping control device according to claim 1, wherein fourth information indicating a region allowed to be grasped by the grasping member is included in the first information, and the selector selects at least one grasping form for the object from among the plurality of grasping forms based on the fourth information and arrangement of the grasping members in each grasping form.

10. The grasping control device according to claim 1, wherein the grasping members include three or more grasping members aligned on a straight line, and a grasping form in which used grasping members are disposed on both sides of an unused grasping member on the straight line is excluded from the plurality of grasping forms selectable by the selector.

11. The grasping control device according to claim 1, wherein when a distance between the obstacle and a first grasping member included in the grasping members determined to be used by the first determination unit is within a predetermined distance, and the object is allowed to be grasped by other grasping member than the first grasping member, the controller controls the grasping device such that the first grasping member is not actuated in a state in which the distance between the obstacle and the first grasping member is within the predetermined distance.

12. The grasping control device according to claim 1, wherein the plurality of usage forms each defines whether each of the grasping members is to be used to grasp the object to realize a grasping form of the plurality of grasping forms without changing relative positions between the grasping members.

13. The grasping control device according to claim 1, wherein a grasping-enabled weight is determined for each of the plurality of grasping forms, and the selector selects a grasping form having a grasping-enabled weight larger than a weight of the object.

14. A grasping system comprising:

the grasping control device according to claim 1; and a manipulator having a grasping member and an actuator controlled by the device to actuate the at least one of the grasping members.

15. The grasping system according to claim 14, wherein the grasping members are relatively fixed.

16. The grasping system according to claim 9, wherein the predetermined pattern of the grasping members has symmetry, and a first pattern and a second pattern are symmetric when viewing the first pattern and the second pattern without changing positions of the grasping members where grasping members to be used and not to be used to grasp the object in a first usage form are arranged in the first pattern and grasping members to be used and not to be used to grasp the object in a second usage form are arranged in the second pattern, and a grasping member to be used in the first usage form is different form a grasping member to be used in a second usage form, the first usage form and the second usage form realize the same grasping form.

17. A computer program product comprising a non-transitory storage medium including a computer program that causes the circuitry to implement the selector, the first determination unit, and the controller of the device according to claim 1.

18. A grasping control device for controlling a grasping device that grasps an object, the grasping control device comprising:

a memory that stores a plurality of grasping forms each indicating a number of used grasping members of grasping members arranged in a predetermined pattern and an arrangement pattern of the used grasping members, the used grasping members each being to be used to grasp the object without pinching the object in cooperation with another member and the arrangement pattern being realized without changing relative positions between the grasping members; and circuitry configured to implement:
   a selector that selects at least one grasping form for the object from among the plurality of grasping forms;
   a first determination unit that determines a usage form realizing the selected grasping form; and
   a controller that controls the grasping device such that at least one of grasping members grasps the object according to the determined usage form.

\* \* \* \* \*